United States Patent [19]

Nakaoka et al.

[11] 4,178,245
[45] Dec. 11, 1979

[54] FILTRATION METHOD

[75] Inventors: Azuma Nakaoka; Sankichi Takahashi, both of Hitachi, Japan

[73] Assignee: Hitachi, Ltd., Tokyo, Japan

[21] Appl. No.: 514,129

[22] Filed: Oct. 11, 1974

[30] Foreign Application Priority Data

Oct. 12, 1973 [JP] Japan ................................ 48-113950

[51] Int. Cl.² .............................................. B01D 23/24
[52] U.S. Cl. ..................................................... 210/81
[58] Field of Search ................... 210/81, 82, 207, 215, 210/256, 258, 353, 354, 393, 409, 416, 307, 308, 309, 312

[56] References Cited

U.S. PATENT DOCUMENTS

| | | | |
|---|---|---|---|
| 1,734,999 | 11/1929 | Cruickshank | 210/409 |
| 2,743,154 | 4/1956 | Kaufman et al. | 210/33 X |
| 3,311,239 | 3/1967 | Valdespino | 210/207 X |
| 3,353,678 | 11/1967 | Dragon | 210/307 X |
| 3,713,540 | 1/1973 | Davidson et al. | 210/81 X |

FOREIGN PATENT DOCUMENTS 841399 5/1939 France ...................................... 210/207

Primary Examiner—Robert H. Spitzer
Attorney, Agent, or Firm—Thomas E. Beall, Jr.

[57] ABSTRACT

A filtration method employs a water tank, a filtration tank within the water tank and provided with a filter material for straining solids from sewage supplied to the water tank, to produce filtered water within the filtration tank, a shield or guide plate encompassing the filtration tank adjacent the filter material to provide a liquid flow passage therebetween, and a bubble generator having a plurality of openings for generating bubbles within the flow zone, so that the bubbles pass along the filter material. Sewage water that is supplied to the water tank is conducted to the flow zone where part of the water passes through the filter material and solids suspended therein are strained out and attached to the outer surface of the filter material. The generated bubbles passing through the flow zone create a difference in pressure between a point at which the fluid including the bubble is flowing in the water flow zone and an opposite point within the filtered water chamber of the filtration tank, which will dislodge the solids attached to the filter material and prevent clogging of the filter material so that the filtration and passage of bubbles may be continuous without clogging.

3 Claims, 2 Drawing Figures

FILTRATION METHOD

BACKGROUND OF THE INVENTION

The present invention relates to a filtration method for filtering solid suspended within sewage water.

In order to remove solids suspended in sewage water, various methods and apparatus with the separation of liquid and solids have been employed according to the particular properties of the solids involved.

For the treatment of sewage water containing a substantial amount of suspended solids, various precipitation tanks have been employed. In order to concentrate solids separated by a precipitation tank, various dehydrators, for example a centrifugal dehydrator and a filter press machine, have been used according to the particular properties of the solids involved.

The precipitation tanks, in general, have been of the type employing a large plane area for their location. Since the separation capacity of a precipitation tank depends upon the sedimentation speed of the solids therein, it has been found necessary to employ a large sedimentation area, that is, a large plane area for the location to increase the separation capacity. When the sedimentation area of the precipitation tank is small, the quality of the treated water becomes unsatisfactory.

Therefore, it has been a requirement that precipitation tanks have a large plane area for their location. Filtration methods and apparatus to take the place of such filtration tanks and avoid the problems of large areas have been attempted. However, prior attempts have employed filters that have had the defect that the filters become blocked quickly by the attachment of solid to the filter material surface.

For example, there is known a method and apparatus such that the period of time when the filter is blocked is obtained theoretically and through experience, so that after such time has passed, the filtration operation is interruped and the filter is washed to remove the attached solids. Such stoppage of filtration and washing will prevent the clogging or blocking of the filter, but has the disadvantages of waste down time.

Furthermore, there has been provided another method employing two filtration tanks having filter materials. According to this method and apparatus, while one of the filtration tanks is used for filtration, the filter of the other filtration tank is being washed; thereafter, the filtration tank that has just been washed is used for filtration while the remaining filtration tank is washed. This operation employing two filtration tanks has the advantage that filtration is continuous, whereas the washing of only one filtration tank requires an interruption in the filtering.

However, both of the operations employing the filtration tanks require a period for the washing operation of a filter that has been used, during which time the filter may not be used for filtration. As mentioned above, blocking of the filter prevents the continuous filtration of suspended solids contained in sewage water, because in order to avoid such blocking it is necessary to remove the solids attached to the surface of the filter before the solids block the filter, which removal has been accomplished only without further filtration.

SUMMARY OF THE PRESENT INVENTION

Accordingly, it is an object of the present invention to provide a filtration method for continuous separation of suspended solids from sewage water without an interruption of such separation, by preventing the blocking or clogging of the filter material by continuously removing solids attached to the inner and outer surface of the filter material during the process of filtration.

Particularly, the present invention employs apparatus having a water tank in which sewage material containing suspended solids is conducted, a filtration tank covered with a filter material and disposed within the water tank, a shield or guide member encompassing the filtration tank and mounted closely adjacent and spaced a small distance from the filtration tank to define a water flow zone between the shield member and the filter material, at least one bubble generator producing a bubble flow within the water flow zone, a conduit for removing the filtered water from within the chamber formed within the filtration tank, and a conduit for discharging the thus separated solids and associated sewage water from the water tank outside of the filtration tank.

BRIEF DESCRIPTION OF THE DRAWING

Further objects, features and advantages of the present invention will become more clear from the following detailed description of the drawing, wherein.

DESCRIPTION OF THE PREFERRED EMBODIMENT

Figure 1:
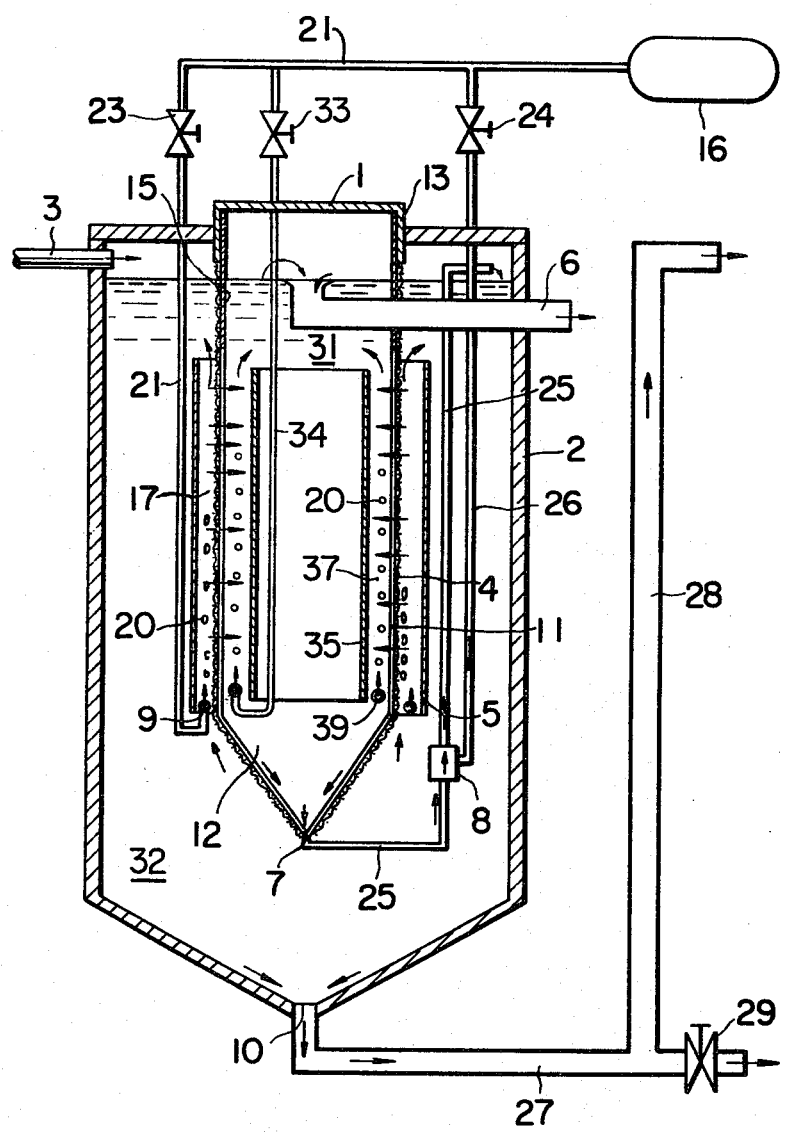
FIG. 1 is a vertical cross sectional view, in somewhat schematic form, of a filtration apparatus embodying the present invention.

As shown in FIG. 1, a preferably cylindrical filtration tank 1 is covered with a cylindrical filter cloth material 4, and the entire unit is disposed within a water tank 2 to form a filtered water chamber within the filtration tank and a sewage chamber between the filtration tank and the water tank. The filtration cloth is employed so as to filter the sewage water within the water tank 2 and obtain filtered or relatively clean water within the filtration tank 1. An inflow conduit 3 is sealingly and fixedly secured through the wall of the water tank 2 to communicate with the inner sewage chamber 32 of the tank 2. Sewage water containing suspended solids is admitted into the sewage water chamber 32 of the water tank 2 through the inflow conduit 3.

Closely adjacent to the outer surface of the filter material 4, there is provided a shelter or guide plate 5 that encompaseses the filtration tank 1. Also, a cylindrical shield or guide plate 35 is disposed within the filtered water chamber 31 of the filtration tank 1 in closely spaced relationship with respect to the inner surface of the filter material 4. Thus, a vertically extending annular water flow zone 17 is formed between the filter material 4 and the guide plate 5 to provide for the flow of sewage water through the zone. Also, a vertically extending annular space 37 is formed between the inner surface of the filter material 4 and the guide plate 35 so as to form a second flow zone or passage for filtered water.

Spray conduits 9 and 39 are provided in the lower portions of the water flow zones 17 and 37, respectively and are fluid connected with a pressurized air source 16 through conduits 21, 34 respectively. The conduits 9 and 39 are provided with a plurality of openings to constitute spraying devices that will produce a flow of bubbles around the entire lower portion of the water flow zones 17, 37, so that the spraying devices 9, 39 with their openings, the conduits, 21 34 and the air source 16 form a bubble generator. Valves 23, 33 are located in the conduits 21, 34, respectively, so as to control the quantity of air supplied to the spraying devices 9, 39 and thus control the quantity of bubbles produced by the spraying devices. It is seen that the guide plates 5 and 35 will confine the thus produced bubbles to pass along respectively the inner and outer surface of the filter material.

An outflow conduit 6 sealingly and fixedly passes through the upper portion of the water tank 2 and the filtration tank 1, to communicate with the filtered water chamber 31 formed within the filtration tank 1 for removing the filtered clean water from the filtration tank 1. The filtration tank 1 is further provided with a conical lower portion or bottom wall 12 that downwardly extends to an outlet 7 to receive, collect and discharge minute solids that have passed through the filter material 4 and which have precipitated to the conical bottom 12. These minute solids are passed through the outlet conduit 7 into the collection conduit 25 under the suction pressure produced by an air jet pump 8 to pass under pressure through the upper portion of the conduit 25, where they may be discharged into the sewage water within chamber 32 formed between the water tank 2 and the filtration tank 1 as shown in FIG. 1, or these minute solids may be transported by a conduit (not shown) from the conduit 25 to outside of the water tank 2, for further processing as desired. The air jet pump 8 is driven by pressurized air conducted from the air source 16 through a conduit 26, which conduit 26 is provided with a valve 24 for controlling the quantity of air supplied to the air jet pump 8.

Precipitated solids from the sewage within chamber 32 between filtration tank 1 and water tank 2 fall to and are collected by the downwardly extending conical bottom of the water tank 2 leading to the outlet 10. From the outlet 10, these precipitated solids are discharged through a conduit 27 to a dehydration process (not shown) or the like, or after-treatment of the solids, or they are returned to an aerated tank used for pretreatment of sewage that is supplied through conduit 3 to the water tank 2. A valve 29 is disposed in the conduit 27 to control the amount of the solids and sewage water carrying them that are discharged through the conduit 27 and 28 to the treatment areas mentioned above or otherwise disposed of.

Figure 2:
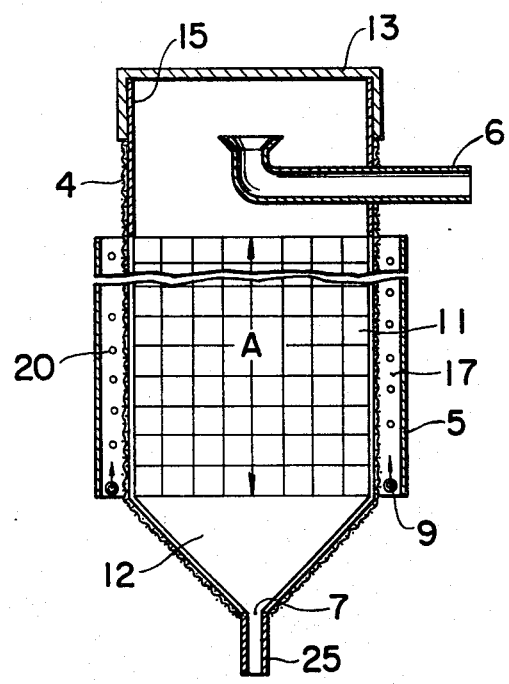
FIG. 2 is a cross sectional view, on an enlarged scale, of the filtration tank employed in FIG. 1.

Details of the filtration tank are shown in FIG. 2, but only with respect to the outside shield member 5, with the inside shield member 35 being removed, since it is not necessary to employ both shield or guide plates. With respect to FIG. 2, a cylindrical filtration tank 1 is provided with a cylindrical filter support member 11 formed from a lattice or grid frame and covered with a filter cloth 4 around its entire outer surface. The lattice frame is fixed at its upper end to a filter support ring 15 and is fixed at its lower end to a conical collection portion 12; the support ring 15 is secured to the water tank 2 as shown in FIG. 1, for suspending the filtration tank within the central portion of the water tank 2. It is seen that the conical shape of the portion 12 collects precipitated solids and conducts them to the discharge conduit 7 for passage into the conduit 25. Further, there is provided a filter fixing cap 13 secured to the upper portion of the support ring 15, so that the filter material or filter cloth is sandwiched between the cap 13 and the supporting ring 15 to firmingly anchor it in place. As seen, the filtered water outflow conduit 16 extends through the filter material 4 and the supporting ring 15.

The filtered clean water in the chamber 31 of the filtration tank 1 is conducted out of the system through the outflow conduit 6 during operation of the above described system. The sewage water containing the suspended solids flows into the sewage water chamber 32 of the water tank 2 through the inflow conduit 3 and flows downwardly to where it will then reverse direction and flow upwardly in the zone 17 between the guide plate 5 and the filter material 4. A part of the water passes through the filter material 4 as shown by the plurality of inwardly directed arrows, while the solids carried by such water are strained and attached to the surface of the filter material 4 so as to produce filtered or relatively clean water within the chamber 31 inside of the filtration tank 1. The relatively clean or filtered water is removed from the chamber 31 of the filtration tank 1 through the overflow, outflow conduit 6. The minute solids that have passed through the filter material 4 precipitate and are collected in the conical bottom of the filtration tank 1 to where they are discharged through the outlet 7 to the outside of the filtration apparatus through the conduit 25 and a further conduit not shown or returned to the sewage water chamber 32 as actually shown in FIG. 1 by means of the air jet pump 8.

The air that is conducted from the air source 16 is sprayed through the openings of the spraying devices 9, 39 to produce a stream of bubbles 20 along the entire bottom of the water flow zone 17, 37, which bubbles will pass upwardly and along the surface of the filter material 4. The bubbles 20 in the water flow zone produce a difference in pressure between the fluid containing the bubbles and the fluid not containing the bubbles. This difference in pressure will effect the removal of the solids that have become attached to the surface of the filter material 4 during the filtration process, to prevent the blockage or clogging of the filter material 4. That is, when the bubbles flow upwardly along the surface of the filter material 4, the phenomenon of the difference of pressure occurs between a point at which a fluid containing a bubble is flowing in the water flow zone and a point on the opposite side of the filter material, for example between chambers 32 and 31, with respect to the filtration tank.

This phenomenon is explained with the Bernoulli theorems and equations with respect to the difference in fluid flow characteristics of fluid containing the bubbles and fluid not containing the bubbles. Referring to a fluid consisting of water containing the suspended solids and a bubble, when the velocity of the fluid is $v_1$, pressure of the fluid is $p_1$, height of the fluid is $h_1$, and the fluid head $H_1$, its flow characteristics may be described by the following equation:

$$H_1 = \tfrac{1}{2}\rho_1 v_1^2 + p_1 + (\tfrac{1}{2}g)h_1$$

In the above equation, $\rho_1$ is the density of the fluid and g is effective gravity.

With respect to another fluid consisting of only water containing the suspended solids and flowing within the water flow zone 17, where its velocity is $v_2$, its pressure is $p_2$, its height is $h_2$, and its head $H_2$ can be described with respect to the following equation:

$$H_2 = \tfrac{1}{2}\rho_2 v_2^2 + p_2 + (\tfrac{1}{2}g)h_2$$

In the above equation, $\rho_2$ is the density of the second fluid. The height $h_1$ is substantially equal to the height $h_2$, and the density $\rho_1$ of the first fluid is substantially equal to the density $\rho_2$ of the second fluid. Accordingly, $\rho_1$ and $\rho_2$ may be represented by $\rho$. Thus, with the combining of these two equations, according to the Bernoulli theorum, the following combined equation is obtained.

$$\tfrac{1}{2}\rho v_1^2 + p_1 = \tfrac{1}{2}\rho v_2^2 + p_2,$$

which may be simplified and rewritten as:

$$p_1 - p_2 = \tfrac{1}{2}\rho(v_2^2 - v_1^2)$$

Since the first fluid includes the bubbles, a sectional area having therein the water is smaller than a sectional area with respect to the fluid not having bubbles. Accordingly, the velocity $v_1$ of the first fluid is substantially larger than the velocity $v_2$ of the second fluid. Since the pressure $p_2$ is maintained so as to be infinitesimally larger than the pressure $p_3$ in the chamber 31, the following formula is established:

$$p_1 - p_3 < 0$$

As a result, a part of the water in the chamber 31 is returned to the water flow zone through the filter cloth 4 due to this pressure differential, and the water passing therethrough removes the solids that are attached to the filter cloth 4. After the bubble has passed, which caused this pressure differential, the pressure at the point outside of the filter cloth is recovered and the pressure is again effective to move the water from outside of the filter material through the filter material in the direction of filtration. Such alternating of the pressure across the filter material would not only pass water back and forth as described above, but will vibrate the filter cloth 4 and detach the solids sufficiently to prevent blocking of the filter material. An identical phenomenon also occurs in the space 37 and minute solids passed through the filter cloth and attached thereto are eliminated by such phenomenon on the inside.

While the above explanation is thought to explain the phenomenon obtained by the present invention, the present invention is effective as shown in actual tests regardless of its theory of operation.

In actual tests using apparatus employing the above-described preferred embodiment of the present invention, sewage water containing suspended solids, for example activated sludge, was treated. When the concentrations of the activated sludge in the chamber 32 of the water tank 2 were between 1000 and 4000 parts per million, an inflow of sewage water was maintained at 31 liters per minute, and the concentrations of the filtered water were in the range of 30 to 40 parts per million on a continuous basis. At the time of the experiments, the difference of the pressure between the water flow zone 17 and the chamber 31 of the filtration tank 1 were substantially zero on the average. The filtration apparatus was operated continuously over a long period of time without a large difference of pressure being obtained across the filter material, which showed that the filter material was not becoming clogged with attached solids. Also, the apparatus was employed with the sewage water containing other suspended solids, and clean water was similarly obtained from the sewage water on a continuous basis. Thus, according to the present invention as described above and shown by actual tests, with the apparatus utilizing the flow of bubbles along the filter material to prevent blocking of the filter, continuous filtration was possible without clogging of the filter material while at the same time filtering out the suspended solids from the sewage water effectively.

While a preferred embodiment of the present invention has been described in considerable detail, which details are important in their own right and for purposes of illustration, further embodiments, variations and modifications are contemplated, for example, the filtration tank may be polygonal, or other shapes may be employed other than cylindrical, and a plurality of such spraying devices may be disposed in spaced parallel relationship to each other, etc., all as encompassed within the spirit and scope of the present invention as defined by the following claims.

We claim:

1. A method of filtering sewage having suspended solids therein, comprising the steps of: passing the sewage through stationary filter material to generally maintain the solids on one side of said filter material and produce filtered water on the opposite side of the filter material; simultaneously passing a stream of gas bubbles along substantially the entire one side of the filter material for causing fluid pressure changes in the sewage around the filter material, and thereby vibrating the filter material continuously as a result of such pressure changes to dislodge the solids from the filter material and prevent clogging of the filter material; positively confining the stream of gas bubbles to flow along and closely adjacent substantially the entire surface of the one side of the filter material, for producing the vibration of the filter material, by means of a shelter member maintained at a fixed close spacing from the one side of said filter material.

2. The method of claim 1, wherein said step of passing bubbles is continuous to vibrate the filter material for the entire time of passing sewage through the filter material and removes the solids at the same rate as their build up on the filter material for continuous operation.

3. The method of claim 2, further including the step of passing gas bubbles along the opposite side of the filter material for further producing vibration of the filter material simultaneously with the step of passing sewage through the filter material.

* * * * *